(12) United States Patent
Yamada et al.

(10) Patent No.: US 10,832,044 B2
(45) Date of Patent: Nov. 10, 2020

(54) IMAGE RECOGNITION DEVICE AND IMAGE RECOGNITION PROGRAM

(71) Applicant: EQUOS RESEARCH CO., LTD., Tokyo (JP)

(72) Inventors: Hideo Yamada, Tokyo (JP); Kazuhiro Kuno, Tokyo (JP)

(73) Assignee: EQUOS RESEARCH CO., LTD., Tokyo (JP)

( * ) Notice: Subject to any disclaimer, the term of this patent is extended or adjusted under 35 U.S.C. 154(b) by 110 days.

(21) Appl. No.: 16/088,766

(22) PCT Filed: Mar. 30, 2017

(86) PCT No.: PCT/JP2017/013278
§ 371 (c)(1),
(2) Date: Sep. 26, 2018

(87) PCT Pub. No.: WO2017/170875
PCT Pub. Date: Oct. 5, 2017

(65) Prior Publication Data
US 2019/0130178 A1    May 2, 2019

(30) Foreign Application Priority Data
Mar. 30, 2016  (JP) .................................. 2016-068435

(51) Int. Cl.
*G06K 9/00* (2006.01)
*G06T 7/00* (2017.01)
(Continued)

(52) U.S. Cl.
CPC ....... *G06K 9/00369* (2013.01); *G06K 9/3216* (2013.01); *G06K 9/3233* (2013.01);
(Continued)

(58) Field of Classification Search
CPC .......... G06K 9/00778; G06K 9/00771; G06K 9/00993; G06K 9/03; G06K 9/6202;
(Continued)

(56) References Cited

U.S. PATENT DOCUMENTS

2010/0007740 A1* 1/2010 Greiffenhagen ............................ G08B 13/19604
348/169
2013/0321624 A1  12/2013 Li et al.

FOREIGN PATENT DOCUMENTS

| JP | 2004-235711 A | 8/2004 |
| JP | 2013-250604 A | 12/2013 |
| JP | 2016-012311 A | 1/2016 |

OTHER PUBLICATIONS

Zheng et al., "Partial Person Re-identification," 2015 IEEE International Conference on Computer Vision, Dec. 7, 2015, pp. 4678-4686.

(Continued)

*Primary Examiner* — Duy M Dang
(74) *Attorney, Agent, or Firm* — Oliff PLC

(57) ABSTRACT

An image recognition device adds a margin region filled with predetermined image data to a periphery of a captured image captured by a camera to create an expanded image larger than the captured image. When a person is too close to the camera, a part of a person image protrudes from the captured image, but a large detection window which also includes the margin region is set, whereby a window image including a protruding region is taken out of the expanded image. The window image lacks a protruding part of the person image, but it is an image showing an entire body of the person image. The image recognition device stores many reference images assuming various states of a person. The image recognition device extracts features from the window (Continued)

image, and compares them with a feature of the reference image, thereby recognizing the person image.

20 Claims, 7 Drawing Sheets

(51) Int. Cl.
*G06K 9/46* (2006.01)
*G06K 9/32* (2006.01)
*G06K 9/62* (2006.01)
*G06K 9/66* (2006.01)

(52) U.S. Cl.
CPC ......... *G06K 9/4642* (2013.01); *G06K 9/6255* (2013.01); *G06K 9/66* (2013.01); *G06T 7/00* (2013.01)

(58) Field of Classification Search
CPC ........... G06K 9/00221; G06K 9/00335; G06K 9/00369; G06K 9/627; G06K 9/00718; G06K 9/6256; G06K 9/62; G06K 2209/21; G06Q 30/0281; G06F 3/011; G06F 3/0304; G06F 16/2264; G06F 16/9024; G06F 3/0346; A63F 13/213; A63F 13/24; A63F 13/426; A63F 13/428; A63F 13/655; A63F 13/00; G06T 7/73; G06N 3/04; G06N 3/08; G06N 3/02; H04N 7/181; H04N 5/2226; G08C 17/00; G08C 17/02; G08B 13/196; G08B 13/19608; G08B 13/19606; B64C 39/024; B64C 2201/00; G05D 1/0033; G05D 1/0038; G05D 1/0044; G05D 1/0231; G05D 1/0214; G05D 1/0212; A61B 2034/2065; B60T 2210/00; B60T 2210/30; B60T 2210/32; G08G 1/0968; G01C 21/3626

See application file for complete search history.

(56) References Cited

OTHER PUBLICATIONS

Aug. 5, 2019 Extended Search Report issued in European Patent Application No. 17775409.0.
Jun. 13, 2017 International Search Report issued in International Patent Application No. PCT/JP2017/013278.
Oct. 2, 2018 International Preliminary Report on Patentability issued in International Patent Application No. PCT/JP2017/013278.

* cited by examiner

LEARNED IMAGE — RECOGNIZABLE — WINDOW IMAGE

LEARNED IMAGE — RECOGNIZABLE — WINDOW IMAGE

LEARNED IMAGE ←RECOGNIZABLE→ WINDOW IMAGE

LEARNED IMAGE ←RECOGNIZABLE→ WINDOW IMAGE

LEARNED IMAGE — RECOGNIZABLE — WINDOW IMAGE

LEARNED IMAGE — RECOGNIZABLE — WINDOW IMAGE

LEARNED IMAGE ↔ RECOGNIZABLE ↔ WINDOW IMAGE

LEARNED IMAGE ↔ UN-RECOGNIZABLE ↔

IMAGE RECOGNITION DEVICE AND IMAGE RECOGNITION PROGRAM

TECHNICAL FIELD

The present invention relates to an image recognition device and an image recognition program and, for example, to those which recognize an object shown in an image.

BACKGROUND ART

In recent years, image recognition technologies have been used in various fields of industries or societies, for example, to recognize an object from a captured image for control when a camera is mounted in a robot or a vehicle or to recognize images of people and thereby observe a flow of the people when a camera is installed a street.

Some of these image recognition technologies are carried out by storing a reference image showing features of an object or a non-object (required for recognizing that an image is not the object) in an image recognition device in advance and comparing features of the reference image with those of a camera image.

As such image recognition technologies, there is an "object detection device" of Patent Literature 1.

This technology is configured to detect an object shown in an image by using an HOG (Histogram of Oriented Gradients) feature amount.

FIG. 7 are views for illustrating an image recognition method according to a conventional example.

As shown in FIG. 7(a), it is assumed that a person image 5 which is a recognition target is shown in an image 1 captured by a camera.

An image recognition device detects this person image 5 as follows.

First, the image recognition device sets a plurality of reference lines (base lines) corresponding to standing positions of a person in the image 1.

In the example shown in the drawing, the reference lines 2a, 2b, 2c, and 2d are set at positions which are 1 m, 5 m, 10 m, and 15 m from the camera.

Since the person is shown on an upper side of the image 1 as he/she gets farther from the camera, the reference lines 2 (when the reference lines 2a to 2d are not discriminated from each other in particular, they are simply written as the reference lines 2, and this can be likewise applied to other elements) are set from the lower side of the image 1 in this order.

Then, the image recognition device sets detection windows 3a to 3d, which use the reference lines 2 as their lower ends respectively, in accordance with each reference line 2.

A size of each detection window 3 is set to a size which allows an entire body to be fitted in when a person is standing at a distance defined by each reference line 2.

This setting is configured to attain the consistency with the reference image since the reference image showing the entire body of the person is used.

Then, the image recognition device extracts features of a window image 4 surrounded by each detection window 3 while moving (shifting) the detection window 3 along the reference line 2, and compares the features with those of the reference image stored in advance. Further, the person is recognized based on similarities (a correlation) between them.

In this example, features of a reference image 7 showing a person image 8 are compared with features of a window image 4c in a region surrounded by the detection window 3c as depicted in FIG. 7(b), and a person image 5 is thereby recognized.

Meanwhile, when the person is too close to the camera, as shown in FIG. 7(c), the person image 5 protrudes from the image 1, and a window image 4a which lacks a head region and lower legs of the person image 5 is obtained even if the largest detection window 3a is used.

Consequently, as shown in FIG. 7(d), the image recognition device compares the features of the reference image 7 showing the entire body of the person image 8 with the features of the window image 4a showing a part of the person image 5 in the entire screen.

In this case, since shapes, sizes, compositions, and others of the persons in the images are completely different, it is difficult to recognize the person image 5 in the window image 4a from the features of the reference image 7.

Further, when a technique using a luminance gradient such as HOG as features of an image is adopted, since an edge portion 100 where the head region is severed is an end portion of the image, a calculation of the luminance gradient, i.e., extraction of the features is difficult, and any contrivance for the calculation must be applied.

As regards such a problem, a method for creating a reference image in which a part of a person protrudes to the outside of an image and storing it in the image recognition device can be considered, but the reference images in which a part of the person protrudes to the outside of each image in various conformations must be stored to carry out this method, an amount of data to be stored becomes enormous, and implementation of the method is difficult.

Specifically, there are a plurality of (approximately thousands of) reference images (images each showing a whole) to one object, and various kinds of images with missing upper and lower sides, various kinds of images which lack a right side, various kinds of images which lack a left side, and various kinds of images which lack a vertical or lateral side must be prepared and stored for each image, thereby resulting in an enormous amount.

As described above, the conventional technologies have a problem that a recognition target cannot be recognized when a part thereof protrudes to the outside of an image.

When the image recognition device is mounted in a movable body such as a robot or a vehicle, precisely recognizing a close object (a person or a thing) is often important to rapidly perform, e.g., an operation to avoid the object as compared with a case where a distance object is recognized.

In this manner, even if a demand for recognition at a short distance is high, the recognition is impossible since an entire recognition target does not fit in an angle of view of a camera.

CITATION LIST

Patent Literature

Patent Literature 1: Japanese Patent Application Publication No. 2016-12311

DISCLOSURE OF INVENTION

Problem to be Solved by the Invention

It is an object of the present invention to detect a recognition target even if a part of the recognition target protrudes to the outside of an image.

Means for Solving the Problem (1) In order to achieve above mentioned object, the invention described in claim 1 provides an image recognition device comprising: image acquiring means for acquiring an image; reference line setting means for setting a reference line, which corresponds to a distance from the image acquiring means to a subject and is at least partially placed in an outer region of the acquired image, in a horizontal direction to the acquired image; detection window setting means for detecting a detection window having a size corresponding to a position of the reference line along the reference line; window image acquiring means for acquiring a window image of a region included in the set detection window; reference feature data acquiring means for acquiring reference feature data representing features of a recognition target in the image; determining means for determining whether the recognition target is included in the acquired window image by using the acquired reference feature data; and output means for outputting a determination result provided by the determination.

(2) The invention described in claim 2 provides the image recognition device according to claim 1, comprising window image feature data extracting means for extracting window image feature data representing features of the window image from the acquired window image, wherein the determining means compares the acquired reference feature data with the extracted window image feature data to perform the determination.

(3) The invention described in claim 3 provides the image recognition device according to claim 1 or 2, wherein the reference line setting means sets the reference line in the region which is below the acquired image and outside this image.

(4) The invention described in claim 4 provides the image recognition device according to claim 1, 2, or 3, wherein the reference line setting means sets the reference line outside the acquired image in a horizontal direction.

(5) The invention described in claim 5 provides the image recognition device according to any one of claims 1 to 4, comprising complementing means for complementing the outer region with predetermined image data when the acquired window image includes the outer region of the acquired image.

(6) The invention described in claim 6 provides the image recognition device according to claim 5, wherein the complementing means sets a margin region constituted of the predetermined image data around the acquired image to complement the outer region with the predetermined image data.

(7) The invention described in claim 7 provides the image recognition device according to claim 5, wherein the complementing means adds the predetermined image data to the outer region to perform the complementation when the acquired window image includes the outer region.

(8) The invention described in claim 8 provides the image recognition device according to claim 2, wherein the determining means sets weighting of the outer region portion of the image included in the window image to be smaller than weighting of any other portion at the time of the comparison.

(9) The invention described in claim 9 provides an image recognition program which uses a computer to realize functions comprising: an image acquiring function to acquire an image; a reference line setting function to set a reference line, which corresponds to a distance to a subject and is at least partially placed in an outer region of the acquired image, in a horizontal direction to the acquired image; a detection window setting function to detect a detection window having a size corresponding to a position of the reference line along the reference line; a window image acquiring function to acquire a window image of a region included in the set detection window; a reference feature data acquiring function to acquire reference feature data representing features of a recognition target in the image; a determining function to determine whether the recognition target is included in the acquired window image by using the acquired reference feature data; and an outputting function to output a determination result provided by the determination.

Effect of the Invention

According to the present invention, expanding a detection window region to the outside of an image enables detecting a recognition target even if a part of the recognition target protrudes to the outside of the image.

BEST MODE(S) FOR CARRYING OUT THE INVENTION

(1) Outline of Embodiment

Figure 2A:
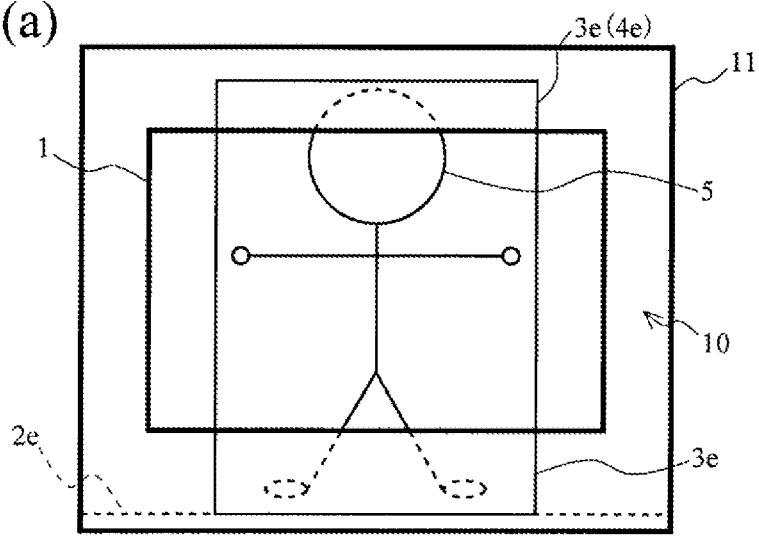
FIG. 2 are drawings for illustrating processing when a person protrudes from an image.

As shown in FIG. 2(a), an image recognition device adds a margin region 10 filled with predetermined image data to a periphery of a captured image 1 captured by a camera to create an expanded image 11 larger than the captured image 1.

When a person is too close to the camera, a part of a person image 5 protrudes from the captured image 1, but a large detection window 3e which also includes the margin region 10 is set, whereby a window image 4e including a protruding region is taken out of the expanded image 11.

Figure 2B:
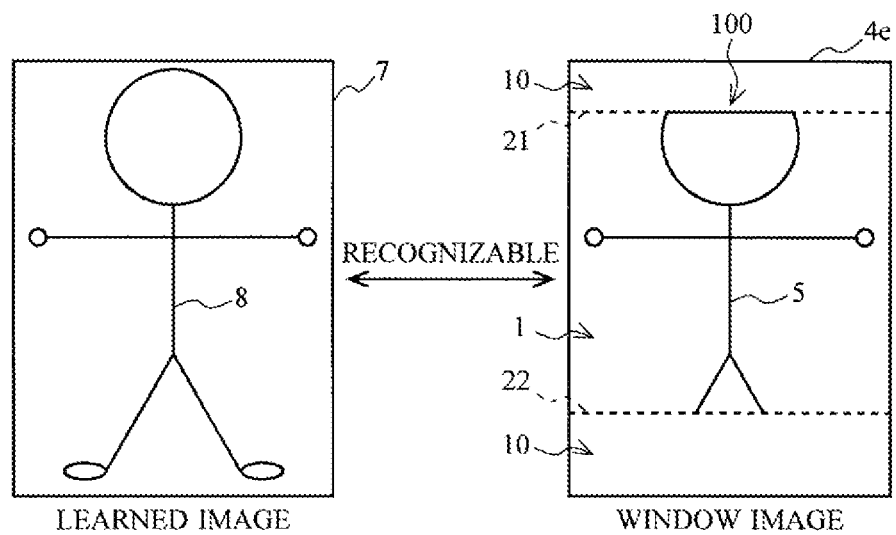

As shown in FIG. 2(b), the window image 4e lacks a protruding part (a head region and a part of lower legs) of the person image 5, but it is an image showing an entire body of the person image 5.

The image recognition device stores many reference images 7 assuming various states of a person 8 (states in which positions, directions, and others of hands or feet differ with respect to each of postures, e.g., walking, running, jumping, or sitting).

It is to be noted that, in this embodiment, a data amount to be stored is reduced by storing a feature amount extracted from each reference image 7 in advance rather than image data of the reference image 7 itself, and a recognition speed is improved by reducing a processing load for extraction of the feature amount of each reference image 7, but each reference image 7 may be stored.

Further, the image recognition device extracts features from the window image 4e, and compares them with a feature amount (which will be simply referred to as the reference image 7 hereinafter) of the reference image 7, thereby recognizing the person image 5.

The reference image 7 and the window image 4e are dissimilar in a portion corresponding to the margin region 10, but they are similar in a portion corresponding to the captured image 1, and hence the person image 5 can be recognized based on the features of the reference image 7.

(2) Details of Embodiment

Figure 1:
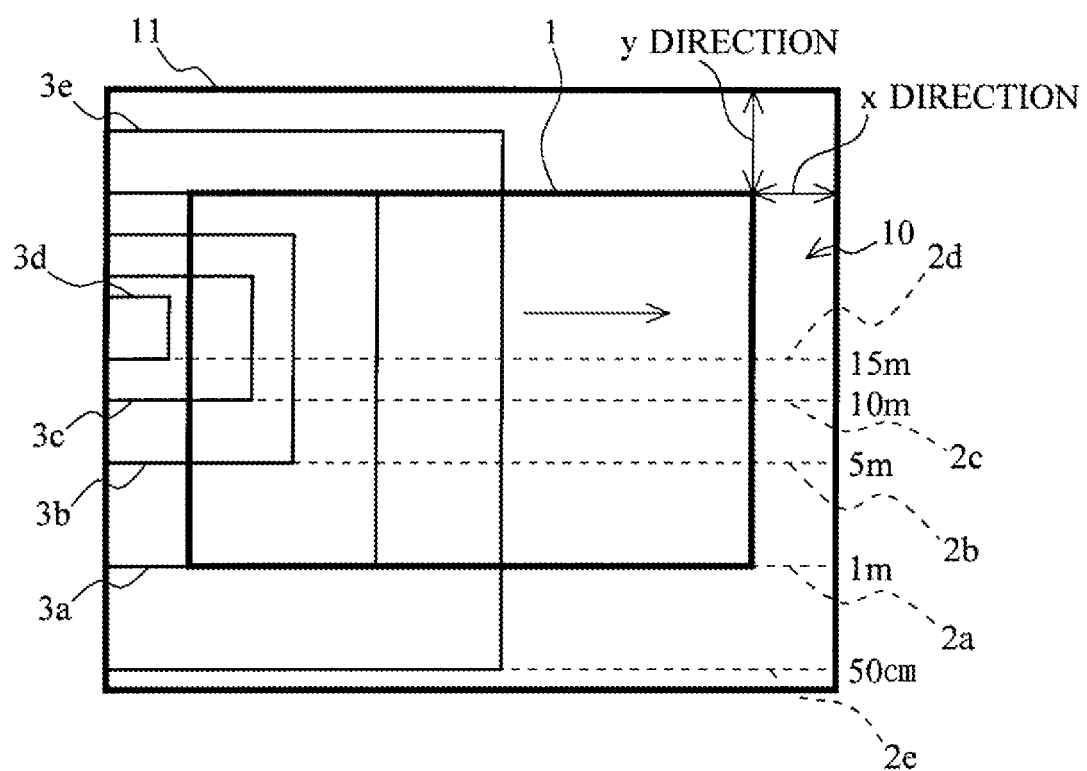
FIG. 1 is a drawing for illustrating a detection window setting method carried out by an image recognition device.

FIG. 1 is a drawing for illustrating a detection window setting method carried out by the image recognition device according to this embodiment.

When a captured image 1 is obtained from the camera, the image recognition device adds a margin region 10 filled with white image data to a whole circumference of an outer peripheral portion of the captured image 1.

Consequently, the image recognition device creates an expanded image 11 which is formed by expanding upper and lower end portions of the captured image 1 in a y direction (a vertical direction) and expanding left and right end portions of the same in an x direction (a horizontal direction).

Here, a vertical expansion amount y and a horizontal expansion amount x used in the expanded image 11 will be described.

Expansion amounts are arbitrarily determined based on a capturing state of the camera, an angle of view or a size of the captured image 1, and others.

For example, when the captured image 1 has a size of 1280 pixels in the horizontal direction and 720 pixels in the vertical direction, the margin region 10 corresponding to 200 pixels is added to each of the upper, lower, left, and right sides.

Furthermore, for example, it is assumed that, when a reference line 2 is set to the lowermost portion of the captured image 1, a size of the detection window 3 is a reference size, each side in the vertical direction is subjected to expansion corresponding to n % of the reference size, and each side in the horizontal direction is subjected to expansion corresponding to m % of the reference size.

Values of n and m are determined in accordance with the reference image 7 corresponding to the recognized image, 25%, 30%, 50%, and the like are used, and n and m may be the same or different values. Moreover, a ratio of n and m may be determined based on an aspect ratio of the reference image.

As described above, the image recognition device includes image acquiring means for acquiring each image and complementing means for setting the margin region 10 consisting of predetermined image data to the periphery of the acquired image to complement the outer region with the predetermined image data.

Here, the margin region 10 is filled with the white image data as an example for the purpose of performing a comparison with feature data of the reference image based on a distribution of a luminance gradient of the image later and of suppressing production of the luminance gradient which becomes noise in the margin region 10.

Thus, the margin region 10 may be complemented with image data having any other color or pattern as long as it does not affect a recognition accuracy.

The image recognition device forms the expanded image 11 in this manner, and then expands the reference lines 2a to 2d corresponding to 1 m, 5 m, 10 m, and 15 m in the x direction so that they are set to reach set the margin region 10 outside the captured image 1.

Additionally, the image recognition device adds a reference line 2e corresponding to a distance of 50 cm from the camera to the margin region 10 provided on the lower outer side of the captured image 1.

It is to be noted that the distances or the number of these reference lines 2 to be set are just examples, and various kinds of settings can be configured depending on a use application or a recognition target of the image recognition device.

For example, in this embodiment, eight reference lines are set in the captured image 1, and two reference lines are set in the expanded margin region 10. However, the number of the reference lines is reduced in the drawing to avoid complication.

As described above, the image recognition device includes reference line setting means for setting the reference lines 2a to 2e, which correspond to distances of a subject and at least some of which are placed in an outer region of the captured image 1, in the horizontal direction to the captured image 1.

Further, the reference line setting means sets the reference line 2e in the region which is below the captured image 1 and outside the captured image 1, and sets the reference lines 2a to 2d on the outer side of the captured image 1 in the horizontal direction.

When the reference lines 2a to 2e are set, the image recognition device sets rectangular detection windows 3a to 3e corresponding to these lines.

The detection windows 3a to 3d are the same as those in the conventional example, and each detection window is set in such a manner that a window frame becomes small in correspondence with a position of each reference line 2 (as a distance from the camera increases) so that an entire body of a person can be appropriately fit in the detection window 3.

Furthermore, each of the detection windows 3a to 3d can move along each extended reference line 2 to the margin region 10 placed outside the captured image 1 in the horizontal direction.

A detection window 3e is added afresh with the new provision of the reference line 2e.

A window frame of the detection window 3e is formed into a size which enables an entire body of a person including a portion protruding from the captured image 1 to be fitted in when the person is standing at a distance of approximately 50 cm from the camera.

In this example, the detection window 3e is set in the margin region 10 outside the upper and lower ends of the captured image 1.

The detection window 3e can move in the horizontal direction along the reference line 2e and scan the expanded image 11 including the margin region 10.

In this manner, since the detection windows 3 are set to cover the margin region 10 of the expanded image 11, the detection windows 3a to 3d can be used for capturing a person even if the person moves from side to side and protrudes from the left and right ends of the captured image 1, and the detection window 3e can be used for capturing a person even if the person has extremely approached the camera and protrudes from the upper and lower ends of the captured image 1.

As described above, the image recognition device includes detection window setting means for setting the detection windows 3a to 3e having the sizes corresponding to the reference lines 2a to 2e along the reference lines 2.

Each drawing of FIG. 2 is a view for illustrating processing when a person has approached a camera and protrudes from the captured image 1.

As indicated by interrupted lines in FIG. 2(a), when a person has moved to a position which is 50 cm to 1 m from a camera, in a person image 5 of the person, a head region protrudes from an upper end of a captured image 1, lower legs protrude from a lower end of the captured image 1, and they are not photographed.

However, since a detection window 3e is expanded to a margin region 10 on the upper end side and the lower end side of the captured image 1, the image recognition device, as shown in FIG. 2 (b), can acquire a window image 4e which shows an entire body of the person image 5 even though the head region and the lower legs are missing.

Here, the window image 4e is an image acquired by the detection window 3e from the expanded image 11, and boundary lines 21 and 22 represent boundaries between the captured image 1 and the margin region 10.

In this manner, the image recognition device includes window image acquiring means for acquiring the window image 4e of a region included in the detection window 3e.

Furthermore, since the margin region 10 is complemented with predetermined image data by complementing means, when the window image 4e includes an outer region of the captured image 1, the outer region is complemented with the predetermined image data by the complementing means.

Moreover, in this example, the margin region 10 is complemented with the predetermined image data in advance and the expanded image 11 is taken out by using the detection window 3e, but the window image 4e having the size of the captured image 1 which lacks the margin region 10 portion can be taken out by using the detection window 3e, and then the margin region 10 can be complemented with the predetermined image data.

In this case, the complementing means performs the complementation by adding the predetermined image data to an outer region when the window image 4e includes the outer region of the captured image 1.

Alternatively, the expanded image 11 (having, e.g., a white color) based on a margin set value may be prepared in advance, and an image 1 may be drawn in a central portion of the expanded image 11 to create the expanded image 11 having a margin set around the image 1.

Comparing the window image 4e with the reference image 7, although the head region and the lower legs of the person image 5 are missing, both the images have compositions close to each other and have similar features except for the head region and the lower legs.

Thus, similarities (a correlation) of features (a feature amount) extracted from the reference image 7 and features (a feature amount) extracted from the window image 4e increase, and the person image 5 of the window image 4e can be recognized. Such a result has been acquired from experiments.

It is to be noted that the image recognition device stores features extracted from each reference image 7 in advance, compares the features with the features extracted from the window image 4e, and outputs a comparison result.

As seen from the above, the image recognition device includes reference feature data acquiring means for acquiring reference feature data (feature data extracted from the reference image 7) representing features of a recognition target, determining means for determining whether the recognition target (the person image 5) is included in the window image 4e by using the acquired reference feature data, and outputting means for outputting a determination result provided by this determination.

Further, the image recognition device includes window image feature data extracting means for extracting window image feature data (features of the window image 4e) representing the features of the window image 4e from the window image 4e, and the determining means makes a determination by comparing the acquired reference feature data with the extracted window image feature data.

Although existing various technologies to recognize the person image 5 from the window image 4e can be used, this embodiment adopts an MRCoHOG (Multi Resolution CoHOG) technology as an example.

The MRCoHOG technology is a technology of a system which performs image recognition by using a luminance gradient, and it is provided by further improving a CoHOG (Co-occurrence HOG) technology obtained by improving an HOG technology to maintain robustness while reducing a processing operation amount.

According to the HOG technology, an image is divided into small regions called cells. Furthermore, a luminance gradient of each pixel in the cells is quantized in, e.g., eight directions, and a histogram showing how frequently the luminance gradient in each direction appears is created.

Moreover, after the histograms are normalized in blocks each including a plurality of cells, the histograms of all the cells arranged in a line and output in this state become features of the image.

Comparing them with features of a reference image 7 enables recognizing a recognition target in the image. The recognition of the recognition target depends on, e.g., a likelihood which is a predetermined threshold value or more.

According to the CoHOG technology, a screen is divided into cells (which are also referred to as blocks) like the HOG technology, and a luminance gradient of each pixel in the cells is quantized.

Additionally, attention is focused on a given pixel in the cells, and a vote is given to each histogram based on a combination (co-occurrence) of a luminance gradient direction of this pixel and a luminance gradient direction of a previously designated neighboring pixel. This is conducted to all pixels in the cells.

For example, when a luminance gradient direction of a pixel of interest is a right direction and a luminance gradient of a neighboring pixel is an upper direction, a vote is given to a matrix element in a right row and an upper column. In this manner, a co-occurrence matrix is created in accordance with each cell.

Further, co-occurrence matrix elements of all the cells arranged in a line and output in this manner become features of the image.

Comparing them with a feature amount of a reference image 7 enables recognizing a target in the image.

According to the MRCoHOG technology, the co-occurrence is taken between images which show the same target and have different resolutions.

For example, images having three kinds of resolutions, i.e., high, medium, and low resolutions are prepared by creating a medium-resolution image and a low-resolution image from a high-resolution image.

Furthermore, attention is focused on a given pixel in the high-resolution image, and a vote is given to a co-occurrence matrix based on a combination of a direction of a luminance gradient of this pixel and directions of luminance gradients of pixels having a medium resolution and a low resolution adjacent to this pixel. This processing is performed to all pixels in the high-resolution image.

In some cases, a pixel in the medium-resolution image or the low-resolution image is determined as a pixel of interest, and the same voting is performed.

Moreover, all co-occurrence matrix elements arranged in a line and output in this state become features of the image.

Comparing them with the features of the reference image 7 enables recognizing the target in the image.

It is to be noted that, when the CoHOG technology or the HOG technology is used, one piece of unified reference feature data may be created (learned) from respective pieces of feature data extracted from the plurality of reference images 7, and the unified reference feature data may be stored in accordance with each recognition target. Consequently, an amount to be compared with a window image 4 can be greatly reduced.

In this embodiment, since the luminance gradients are used for the image recognition in this manner, when attention is focused on an edge portion 100 of a head region, there is no adjacent pixel if the margin region 10 is not present, and hence each luminance gradient cannot be calculated.

However, in a window image 4e, since adjacent pixels of the edge portion 100 are formed by adding the margin region 10, the luminance gradients in this portion can be calculated, and hence the feature extraction technology using the luminance gradients can be utilized.

Figure 2C:
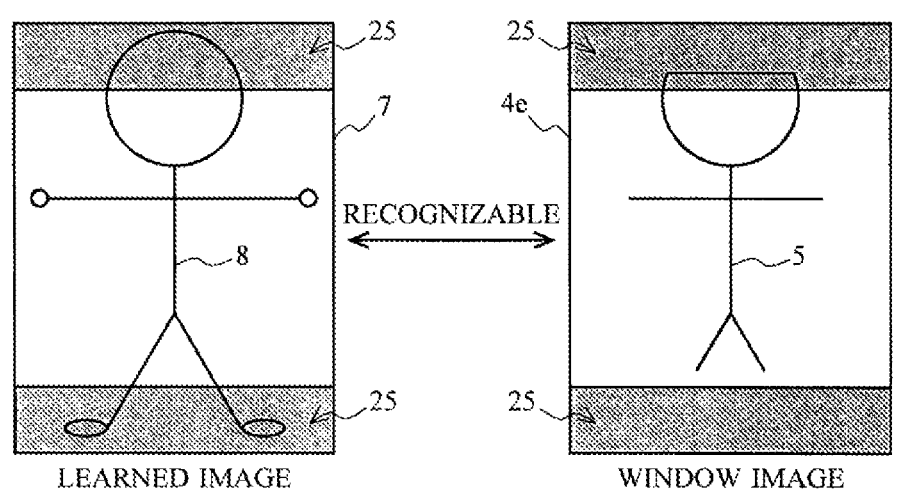

FIG. 2(c) is a drawing for illustrating an attempt to further enhance a correlation of a reference image 7 and a window image 4e.

When the reference image 7 is compared with the window image 4e, they are obviously dissimilar in a margin region 10. Thus, in this example, at the time of determining the similarity of the reference image 7 and the window image 4e, weighting of a region 25 corresponding to the margin region 10 is reduced.

When the weighting of the portion corresponding to the margin region 10 is reduced to be smaller than the reference image 7 and the portion of the window image 4e corresponding to the captured image 1 and the similarity of the features of both the images is determined in this manner, a recognition accuracy can be further enhanced.

In this example, at the time of performing the comparison, the determining means sets the weighting of the portion which is the outer region of the captured image 1 included in the window image 4e to be smaller than the weighting of any other portion.

It is to be noted that the region 25 does not have to precisely coincide with the margin region 10, and it is possible to determine to what extent the region 25 is set in correspondence with experiments or situations.

For example, in case of extracting a feature amount based on luminance gradients, since a luminance gradient different from that of the original person image 5 is produced at a boundary (a cut position of the head region or the lower legs) between the captured image 1 and the margin region 10, there is a possibility that this becomes noise.

In this case, each region 25 can be expanded to a position which covers such a cut position, and the weighting of this position can be reduced.

Each view in FIG. 3 is a drawing for illustrating processing when a person has extremely approached a camera to protrude from upper and lower ends of a captured image 1 as well as a left end of the same.

Figure 3A:
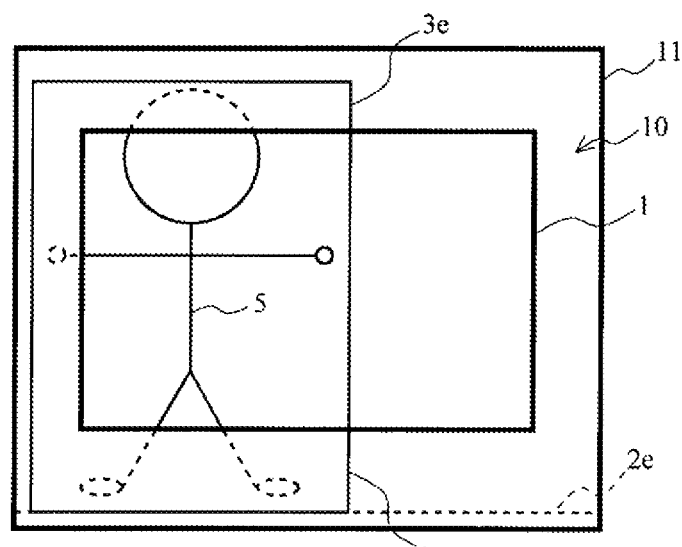
FIG. 3 are drawings for illustrating processing when a person protrudes from an image.

As indicated by interrupted lines in FIG. 3(a), when the person has approached to a position which is approximately 50 cm to 1 m from the camera to get closer to a left end of an angle of view, a person image 5 of this person has a head region protruding from an upper end of a captured image 1 and lower legs protruding from a lower end of the captured image 1, and a left part is not photographed.

Figure 3B:
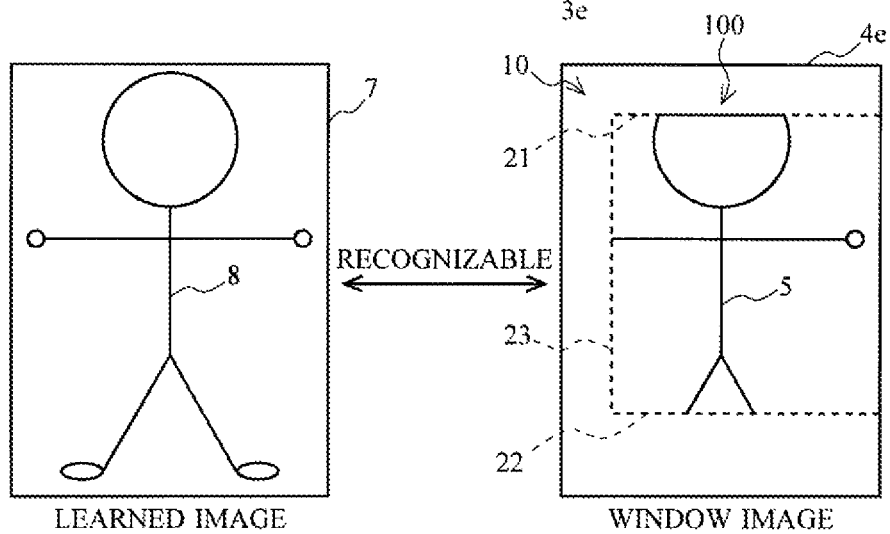

However, since a detection window 3e is expanded to a margin region 10 on the upper and lower end sides and the left end side of the captured image 1, the image recognition device can acquire a window image 4e showing an entire body of the person image 5 even though the head region, the lower legs, and the left part are missing as shown in FIG. 3(b).

Comparing the window image 4e with a reference image 7, the head region, the lower legs, and the left part of the person image 5 are missing on outer sides of boundary lines 21 to 23, but both the images have compositions close to each other and have similar features except for the missing parts.

Thus, a feature amount extracted from the reference image 7 is similar to a feature amount extracted from the window image 4e, and the person image 5 in the window image 4e can be recognized.

Figure 3C:
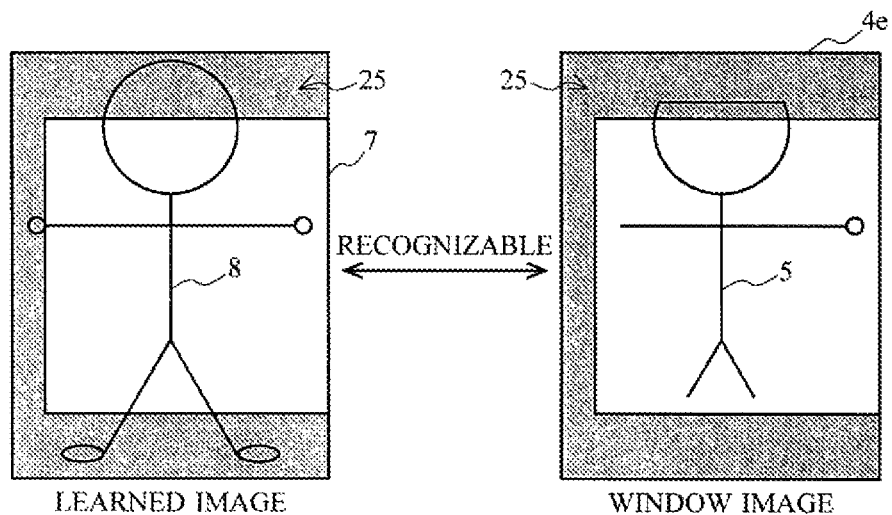

FIG. 3(c) is a drawing for illustrating an attempt to further enhance a correlation between the reference image 7 and the window image 4e.

Like the above example, a region 25 is set to a portion (the upper and lower end portions and the left end portion) corresponding to the margin region 10, and weighting for a feature amount comparison in this portion is set to be smaller than that of any other portion.

Consequently, an improvement in recognition accuracy can be expected.

Figure 4A:
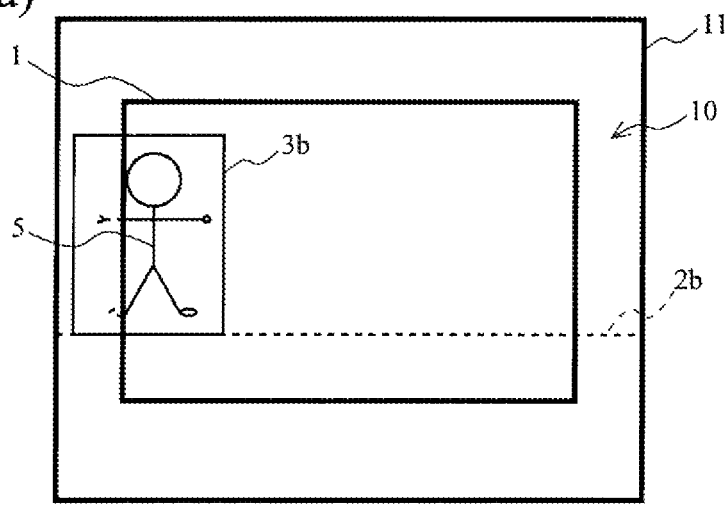
FIG. 4 are drawings for illustrating processing when a person protrudes from an image.
Figure 4B:
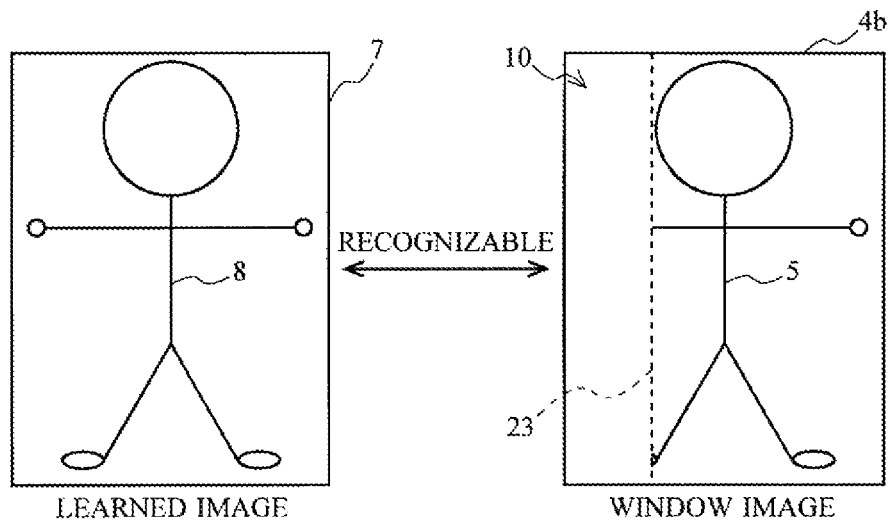
Figure 4C:
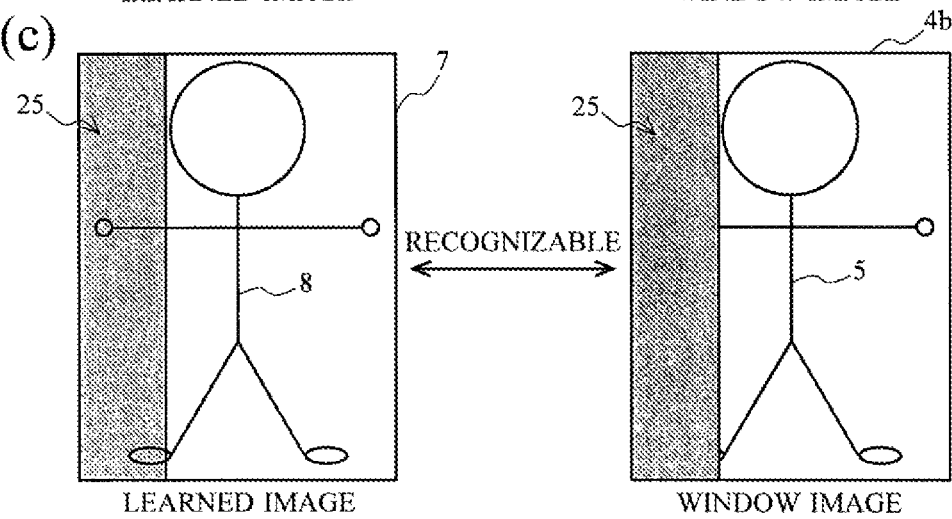

Each view in FIG. 4 is a drawing for illustrating processing when a distance from a camera to a person is distance which enables an entire body of the person to be shown in a captured image 1, but the person is too close to a left end of the captured image 1, and hence a left portion of a person image 5 protrudes to the outside of the captured image 1.

As shown in FIG. 4(a), since a left portion of the person is placed outside the captured image 1, an image of this portion cannot be acquired, but a detection window 3b can move to the left side on an extended reference line 2b, and hence a window image 4b which lacks the left portion but shows an entire body of the person is acquired as shown in FIG. 4(b).

In this manner, the image recognition device can perform the image recognition to the person protruding from the captured image 1 due to the approach as well as a person protruding from an angle of view of the camera even though a distance from the camera is appropriate.

Comparing the window image 4b with the reference image 7, the left portion of the person image 5 is missing and replaced with a margin region 10, but both the images have compositions close to each other and have similar features except for the missing portion.

Thus, comparing a feature amount extracted from the reference image 7 with a feature amount extracted from the window image 4b enables recognizing the person image 5 in the window image 4.

Further, when a region 25 is set to the margin region 10 and weighting of this portion is reduced, a recognition accuracy can be enhanced.

Figure 5:
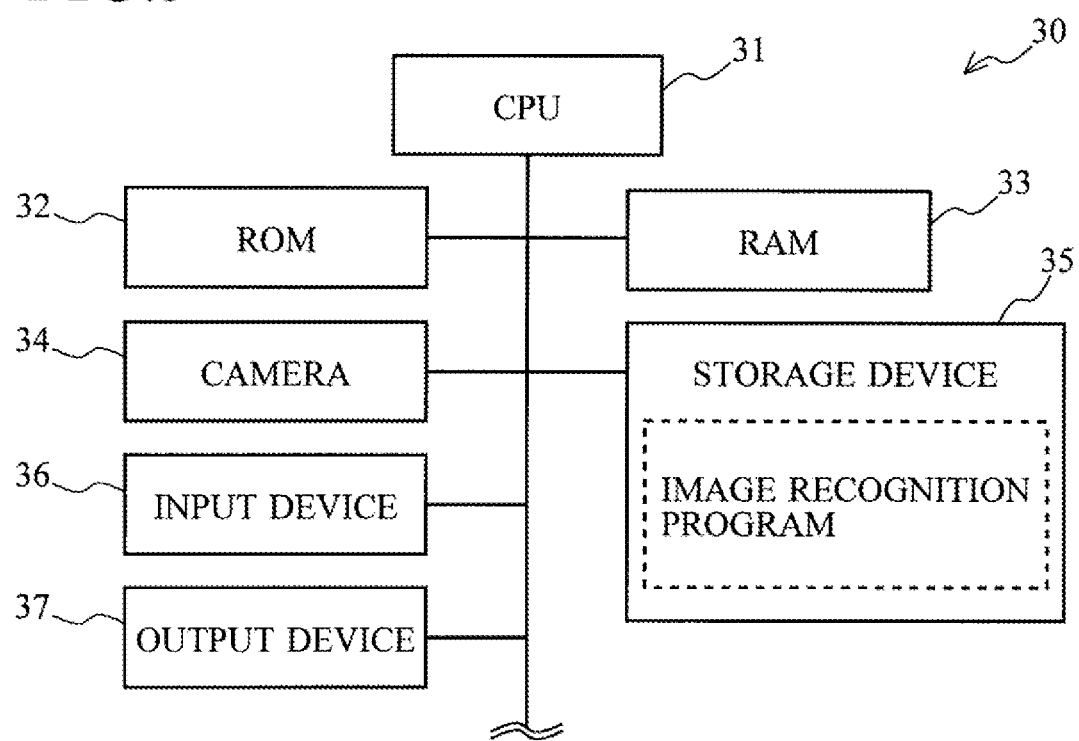
FIG. 5 is a drawing showing an example of a hardware configuration of the image recognition device.

FIG. 5 is a drawing showing an example of a hardware configuration of an image recognition device 30 according to this embodiment.

The image recognition device 30 is constituted of a personal computer having a CPU (Central Processing Unit) 31, an ROM (Read Only Memory) 32, an RAM (Random Access Memory) 33, a camera 34, a storage device 35, an input device 36, an output device 37, and the like connected through a bus line.

The CPU 31 executes image recognition processing in accordance with an image recognition program stored in the storage device 35 as well as control over each section in the image recognition device 30.

More specifically, the CPU 31 executes formation of an expanded image 11 based on the setting of a margin region 10 to an image frame input from the camera 34, setting of reference lines 2a to 2e and detection windows 3a to 3e to the expanded image 11, extraction of a feature amount from a window image 4, recognition of a person image 5 based on a correlation between the extracted feature amount and learned data (a feature amount extracted from a reference image), and others.

The ROM 32 is a read only memory which stores basic programs, parameters, and the like to operate the image recognition device 30 by the CPU 31.

The RAM 33 is a readable/writable memory which provides a working memory to perform the processing by the CPU 31.

Each image frame provided by the camera 34 or a feature amount of the reference image 7 is developed in the RAM 33, and used by the CPU 31.

The camera 34 is connected to the image recognition device 30 through a predetermined interface, and constituted of an imaging element having an imaging surface which converts a projected image into an electrical signal and an optical system which projects a subject onto the imaging surface.

The camera 34 outputs a moving image of the subject (which is a scene in front of a lens and constituted of a person and a background) at a predetermined frame rate, and an image constituting each frame becomes a target of the image recognition processing.

The storage device 35 is a storage device using, e.g., a storage medium such as a hard disk or a semiconductor memory, and it stores the image recognition program which allows the CPU 31 to execute the image recognition processing.

Further, the storage device 35 also stores feature amounts for a large quantity of reference images 7 to recognize the person image 5, and provides them to the CPU 31 for the image recognition processing.

The input device 36 is a device through which various kinds of information are input to the image recognition device 30, and constituted of input devices, e.g., a keyboard or a mouse.

A user can operate the image recognition device 30 by, for example, inputting a command through a keyboard operation or a mouse operation.

The output device 37 is a device through which the image recognition device 30 outputs various kinds of information, and constituted of output devices, e.g., a display or a printer.

A user can operate the image recognition device 30 in accordance with an operation screen shown in the display.

The above configuration is an example, and it is possible to adopt a configuration according to an implementation, e.g., incorporating the image recognition device 30 on an image capture board and further mounting it in a robot.

Figure 6:
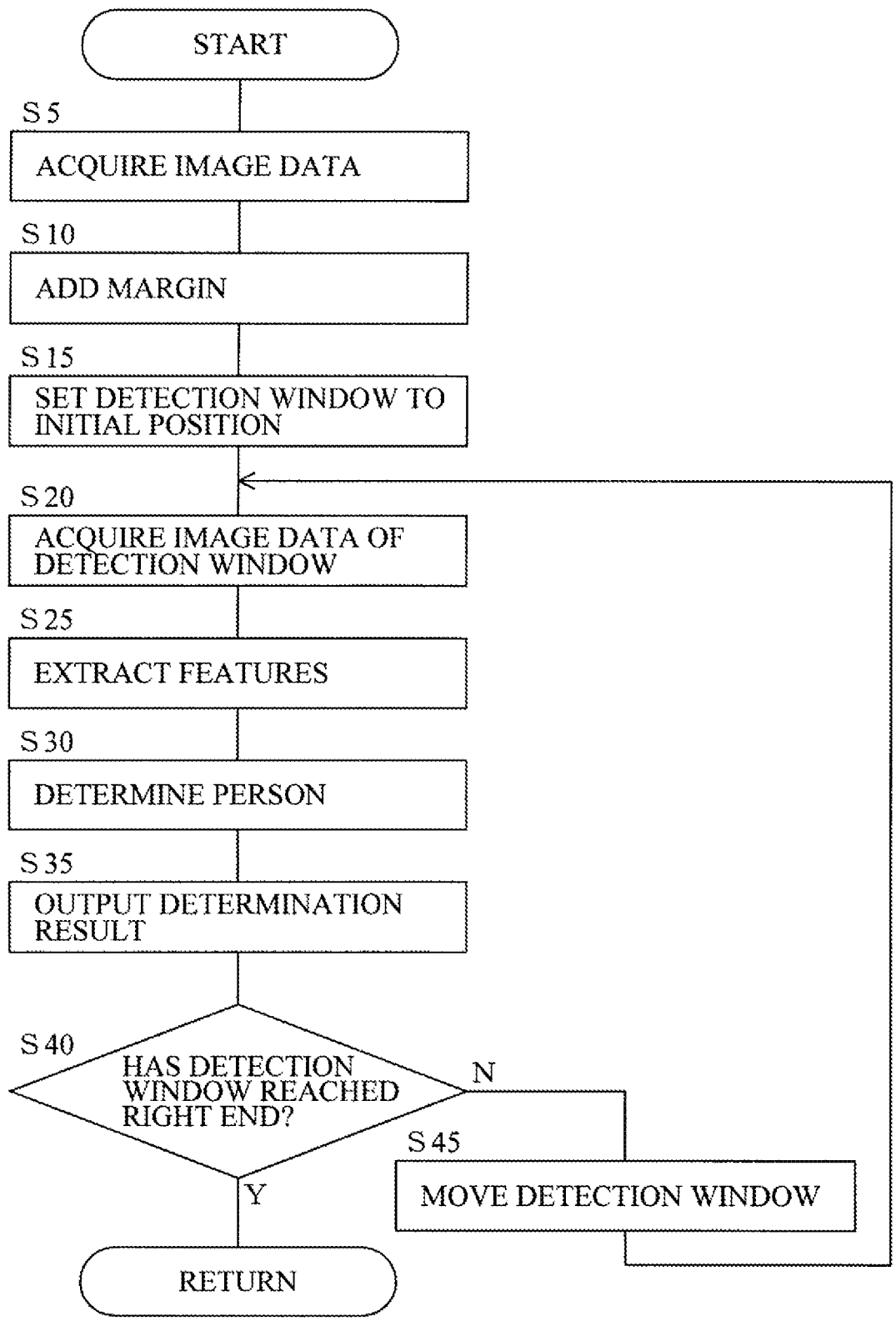
FIG. 6 is a flowchart for illustrating an operation of the image recognition device.
Figure 7A:
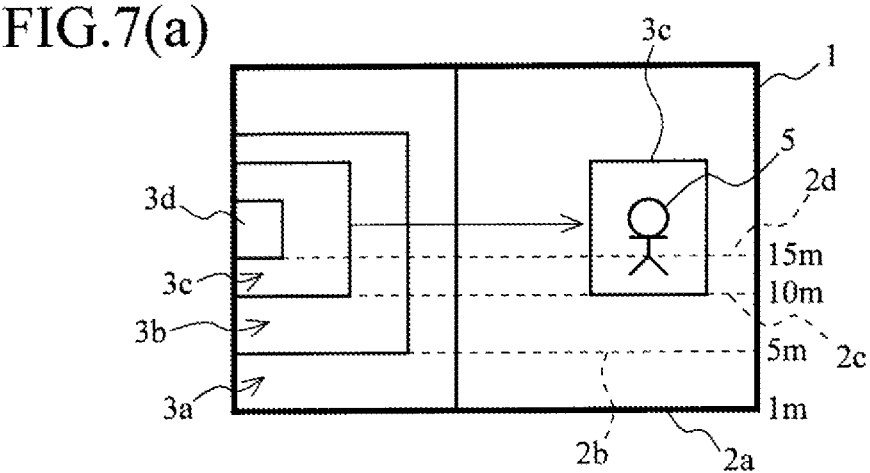
FIG. 7 are drawings for illustrating an image recognition method according to a conventional example.
Figure 7B:
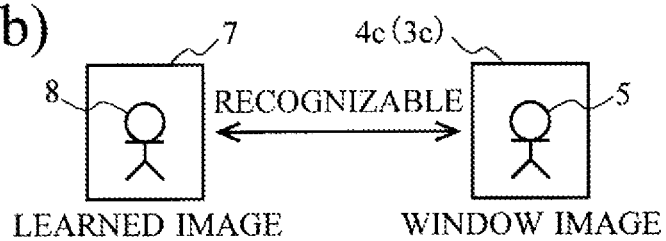
Figure 7C:
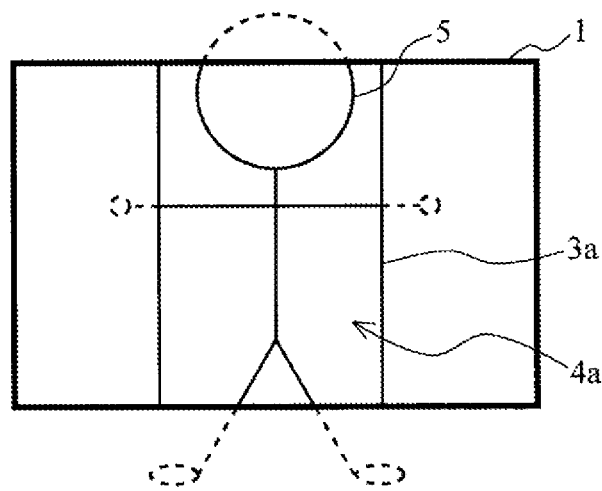
Figure 7D:
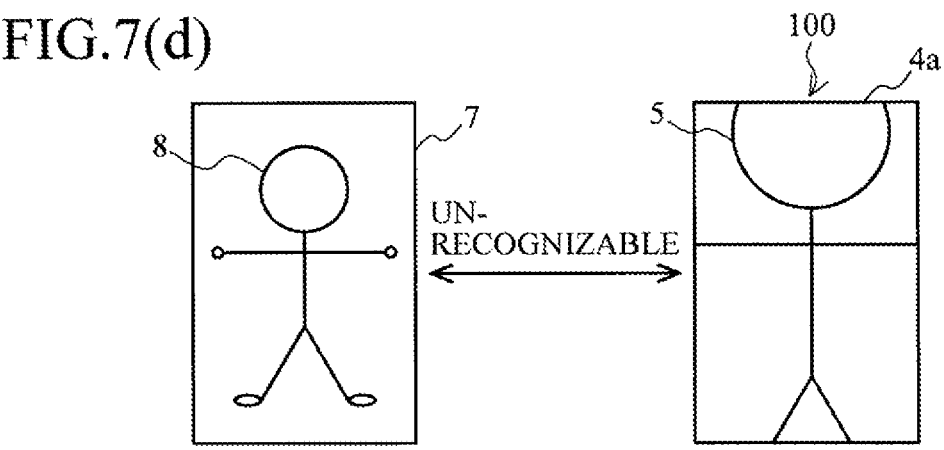

FIG. 6 is a flowchart for illustrating an operation of the image recognition device 30.

The following operation is performed by the CPU 31 in the image recognition device 30 in accordance with the image recognition program.

First, the CPU 31 acquires image data of a captured image 1 from the camera 34, and stores it in the RAM 33 (a step 5).

Then, the CPU 31 adds a margin region 10 to the captured image 1 or writes the captured image 1 in a central portion of an expanded image 11 prepared in advance to create image data of the expanded image 11, and stores it in the RAM 33 (a step 10).

Subsequently, the CPU 31 generates detection windows 3a to 3e, and sets each of them to an initial position (a left end) of the expanded image 11 (a step 15).

After setting the detection windows 3, the CPU 31 acquires image data of an image (a window image) surrounded by each detection window 3, and stores it in the RAM 33 (a step 20).

Moreover, the CPU 31 extracts feature amounts from these pieces of image data in accordance with a predetermined algorithm such as HOG, and stores them in the RAM 33 (a step 25).

Then, the CPU 31 reads out features of many reference images 7 from the RAM 33, compares them with the features extracted from the image data of each window image, and determines whether a person is shown in each window image from the similarity (a step 30).

Additionally, the CPU 31 outputs a determination result to a predetermined output destination (a step 35), and then determines whether a right end of each detection window 3 has reached a right end of the expanded image 11 (a step 40).

When there is a detection window 3 which has reached the right end (the step 40; Y), the expanded image 11 has been completely scanned in relation to this detection window 3, and hence the image recognition processing is terminated.

On the other hand, when there is a detection window 3 which has not reached the right end yet (the step 40; N), since the image recognition processing has not been terminated in relation to this detection window 3, the detection window 3 is move toward the right side in the horizontal direction (a step 45), and the processing returns to the step 20.

Although a search for the person image 5 is conducted by using the detection windows 3a to 3e at the same time in the above processing, the search using the detection window 3a may be first performed, and then the search using the detection window 3b may be performed in sequence, for example.

According to the embodiment described above, the following effects can be obtained.

(1) An original image can be enlarged by adding margins to vertical and horizontal sides of the original image, and a target which partially protrudes from a camera can be recognized by subjecting this image to processing of a detector to which each detection window corresponding to the added margin portions has been added.

(2) It is possible to perform the image recognition to an image which has a feature amount enabling the image recognition but partially protrudes from a peripheral portion of a captured image 1 and hence has been discarded in conventional examples.

(3) Adding a margin region 10 enables expanding a range which can be subjected to the image recognition to the outside of the captured image 1.

(4) To recognize a person image 5 protruding from the captured image 1, a large quantity of person images 5 protruding from the captured image 1 do not have to be stored, and a standard reference image 7 showing an entire body can be used.

EXPLANATION OF LETTERS OR NUMERALS

1 image
2 reference line
3 detection window
4 window image
5 person image
7 reference image
8 person image
10 margin region
11 expanded image
21, 22, 23 boundary line
25 region
30 image recognition device
31 CPU
32 ROM
33 RAM
34 camera
35 storage device
36 input device
37 output device
100 edge portion

The invention claimed is:

1. An image recognition device comprising:
a processor programmed to:
   acquire an image;
   set a reference line, which corresponds to a distance from the image recognition device to a subject and is at least partially placed in an outer region of the acquired image, in a horizontal direction to the acquired image;
   detect a detection window having a size corresponding to a position of the reference line along the reference line;
   acquire a window image of a region included in the detection window;
   acquire reference feature data representing features of a recognition target;
   perform a determination of whether the recognition target is included in the acquired window image by using the acquired reference feature data; and
   output a determination result provided by the determination.

2. The image recognition device according to claim 1, wherein
   the processor is further programmed to extract window image feature data representing features of the window image from the acquired window image,
   wherein the processor compares the acquired reference feature data with the extracted window image feature data to perform the determination.

3. The image recognition device according to claim 2, wherein
   the processor sets the reference line in a region which is below the acquired image and outside of the acquired image.

4. The image recognition device according to claim 3, wherein
   the processor sets the reference line outside the acquired image in the horizontal direction.

5. The image recognition device according to claim 4, wherein
   the processor is further programmed to complement the outer region of the acquired image with predetermined image data when the acquired window image includes the outer region of the acquired image.

6. The image recognition device according to claim 3, wherein
   the processor is further programmed to complement the outer region of the acquired image with predetermined image data when the acquired window image includes the outer region of the acquired image.

7. The image recognition device according to claim 2, wherein
   the processor sets the reference line outside the acquired image in the horizontal direction.

8. The image recognition device according to claim 7, wherein
   the processor is further programmed to complement the outer region of the acquired image with predetermined image data when the acquired window image includes the outer region of the acquired image.

9. The image recognition device according to claim 2, wherein
   the processor is further programmed to complement the outer region of the acquired image with predetermined image data when the acquired window image includes the outer region of the acquired image.

10. The image recognition device according to claim 2, wherein
   the processor sets a weighting of the outer region portion of the acquired image included in the window image to be smaller than a weighting of any other portion of the window image at the time of the comparison.

11. The image recognition device according to claim 1, wherein
   the processor sets the reference line in a region which is below the acquired image and outside of the acquired image.

12. The image recognition device according to claim 11, wherein
   the processor sets the reference line outside the acquired image in the horizontal direction.

13. The image recognition device according to claim 12, wherein
   the processor is further programmed to complement the outer region of the acquired image with predetermined image data when the acquired window image includes the outer region of the acquired image.

14. The image recognition device according to claim 11, wherein
   the processor is further programmed to complement the outer region of the acquired image with predetermined image data when the acquired window image includes the outer region of the acquired image.

15. The image recognition device according to claim 1, wherein
   the processor sets the reference line outside the acquired image in the horizontal direction.

16. The image recognition device according to claim 15, wherein
   the processor is further programmed to complement the outer region of the acquired image with predetermined image data when the acquired window image includes the outer region of the acquired image.

17. The image recognition device according to claim 1, wherein
   the processor is further programmed to complement the outer region of the acquired image with predetermined image data when the acquired window image includes the outer region of the acquired image.

18. The image recognition device according to claim 17, wherein
the processor sets a margin region constituted of the predetermined image data around the acquired image to complement the outer region with the predetermined image data.

19. The image recognition device according to claim 17, wherein
the processor adds the predetermined image data to the outer region to complement the outer region when the acquired window image includes the outer region.

20. A non-transitory computer readable medium storing an image recognition program thereon which causes a computer to realize functions comprising:
an image acquiring function to acquire an image;
a reference line setting function to set a reference line, which corresponds to a distance to a subject and is at least partially placed in an outer region of the acquired image, in a horizontal direction to the acquired image;
a detection window setting function to detect a detection window having a size corresponding to a position of the reference line along the reference line;
a window image acquiring function to acquire a window image of a region included in the detection window;
a reference feature data acquiring function to acquire reference feature data representing features of a recognition target;
a determining function to perform a determination of whether the recognition target is included in the acquired window image by using the acquired reference feature data; and
an outputting function to output a determination result provided by the determination.

* * * * *